US006898376B1

(12) United States Patent
Gerstel et al.

(10) Patent No.: US 6,898,376 B1
(45) Date of Patent: May 24, 2005

(54) OPTICAL RING PROTECTION APPARATUS AND METHODS

(75) Inventors: Ornan A. Gerstel, Los Altos, CA (US); Rajiv R. Ramaswami, Sunnyvale, CA (US)

(73) Assignee: Tellabs Operations, Inc., Lisle, IL (US)

(*) Notice: Subject to any disclaimer, the term of this patent is extended or adjusted under 35 U.S.C. 154(b) by 0 days.

(21) Appl. No.: 09/459,947

(22) Filed: Dec. 14, 1999

Related U.S. Application Data (60) Provisional application No. 60/112,412, filed on Dec. 14, 1995.

(51) Int. Cl.[7] ............................. H01S 3/00; H04B 10/00; H04J 14/00
(52) U.S. Cl. ............................................... 398/5; 398/2
(58) Field of Search ............................ 398/79, 5, 7, 2; 359/110, 124, 154

(56) References Cited

U.S. PATENT DOCUMENTS

| | | | | |
|---|---|---|---|---|
| 5,023,942 A | | 6/1991 | Goepel ..................... 455/601 |
| 5,212,578 A | * | 5/1993 | Grimes et al. .............. 359/110 |
| 5,241,409 A | * | 8/1993 | Hill et al. ..................... 398/56 |
| 5,559,622 A | | 9/1996 | Huber et al. ................ 395/110 |
| 5,579,421 A | | 11/1996 | Duvall et al. ................. 385/14 |
| 5,680,235 A | * | 10/1997 | Johansson ................... 359/110 |
| 5,712,847 A | | 1/1998 | Hata ........................... 370/228 |
| 5,745,274 A | | 4/1998 | Fatehi et al. ................ 359/187 |
| 5,875,048 A | | 2/1999 | Nemecek et al. ........... 359/187 |
| 5,889,610 A | * | 3/1999 | Fatehi et al. ............ 359/341.43 |
| 5,903,371 A | * | 5/1999 | Arecco et al. ................. 398/4 |
| 6,081,359 A | * | 6/2000 | Takehana et al. .............. 398/1 |
| 6,137,603 A | * | 10/2000 | Henmi ....................... 359/110 |
| 6,400,476 B1 | * | 6/2002 | Arecco ....................... 359/110 |

FOREIGN PATENT DOCUMENTS

| | | |
|---|---|---|
| EP | 0 535 858 | 4/1993 |
| EP | 0 535 858 A2 | 4/1993 |
| EP | 0 535 858 A3 | 4/1993 |
| EP | 07143529 | 2/1995 |
| EP | 0 851 704 A2 | 7/1998 |
| EP | 0 851 704 | 7/1998 |
| EP | 0 877 502 A2 | 11/1998 |
| EP | 0 877 502 | 11/1998 |

OTHER PUBLICATIONS

Roldan et al., "Application of Dual–Access Architecture, With Drop and Continue Feature, to WDM Optical Networks", Technology and Infrastructure, 1998, pp. 259–266.

* cited by examiner

*Primary Examiner*—M. R. Sedighian
*Assistant Examiner*—Shi K. Li
(74) *Attorney, Agent, or Firm*—Fitzpatrick, Cella, Harper & Scinto (57) ABSTRACT

An optical communication system comprising plural optical communication paths, a passive optical coupler, and at least one optical node. The passive optical coupler has a plurality of inputs coupled through the passive optical coupler to an output of the passive optical coupler, and each input is coupled in a corresponding one of the optical communication paths. Each optical node comprises plural optical line terminals, each of which is interposed in a corresponding at least one of the optical communication paths. Each optical line terminal is operable to either (a) substantially prevent an optical signal propagating in that corresponding at least one optical communication path from reaching a corresponding input of the passive optical coupler through the at least one optical communication path, or (b) permit the optical signal to propagate in that corresponding at least one optical communication path towards the corresponding input of the passive optical coupler.

37 Claims, 6 Drawing Sheets

OPTICAL RING PROTECTION APPARATUS AND METHODS

CROSS-REFERENCE TO RELATED APPLICATIONS

This application claims the benefit of U.S. Provisional Application No. 60/112,412, filed Dec. 14, 1998.

FIELD OF THE INVENTION

The invention is in the field of optical communications, and more particularly, pertains to a Wavelength Division Multiplexed (WDM) optical communication system in which light path failure is protected against on a per-channel wavelength basis using passive optics such as splitters and couplers.

BACKGROUND OF THE INVENTION

Figure 1:
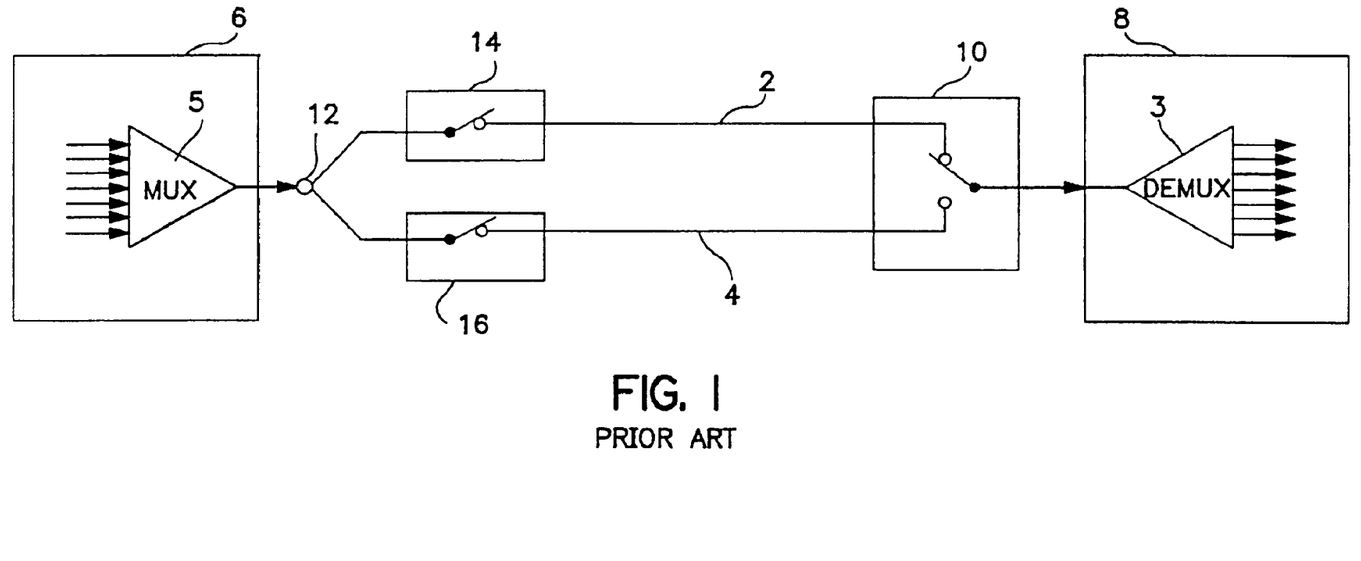
FIG. 1 is a schematic diagram of a prior art scheme for protecting against light path failure at a multiple wavelength facility level.

In WDM links protection against light-path failure is typically at a facility level utilizing active optics such as optical switches. For example, as shown in FIG. 1, a double light path connection for a multiple wavelength signal, i.e. a light path connection having a working optical fiber 2 and a redundant optical fiber 4 is connected between optical nodes 6 and 8 in an optical telecommunication system.

At the node 8 of the receive side, the two optical fibers 2 and 4 are combined by an optical switch 10 via which the working optical fiber 2 is connected to the node 8 of the receive side during normal operation, when a demultiplexer 3 demultiplexes the multiple wavelength into separate individual wavelengths. If a break occurs in the working optical fiber 2, which can be identified at the switch 10 on the basis of the outage of the light transmitted over the working optical fiber 2, the switch 10 automatically switches, so that the redundant optical fiber 4 is now connected to the node 8 of the receive side instead of the working optical fiber 2.

At the node 6 of the transmission side a multiplexer 5 multiplexes a plurality of input separate wavelengths into an optical multiple wavelength facility signal to be transmitted, which is split onto the working fiber 2 and the redundant optical fiber 4 by an optical splitter 12. Two optical switches 14 and 16, both of which are closed in normal operation, are now inserted between the optical splitter 12 and the optical fibers 2 and 4. In case of an alternate circuiting, i.e. given a switching at the receive side from the working optical fiber 2 onto the redundant fiber 4, let the node 6 of the transmission side receive a message during the course of a corresponding protocol. In response thereto that optical switch 16 of the two switches 14 and 16, which is inserted between the redundant optical fiber 4 and the optical splitter 12, continues to remain closed. In contrast, optical switch 14, which is inserted between the optical splitter 12 and the working optical fiber 2, is opened.

Thus, by way of the switching at the receive side, the interrupt time associated with the alternate circuiting continues to be kept short, on the one hand, and, on the other hand, it is assured that shortly after the interruption that the broken fiber no longer carries the optical multiple wavelength facility signal.

A problem with WDM system protecting against light path failure at the facility level is that such protection protects only against breaks in the optical fiber carrying the multiple wavelength facility signal, and does not protect against failures on a per channel basis in the optical fiber, and at the respective optical nodes.

SUMMARY OF THE INVENTION

In view of the above, it is an aspect of the invention to protect against light path failures on a per-channel basis using passive optics such as splitters and couplers.

It is another aspect of the invention to protect against light path failure from a source optical node to a sink optical node via at least one intermediate optical node on a per wavelength basis. At the source optical node an output means outputs first and second multiple wavelength signals on respective first and second light paths. The intermediate node is situated in at least one of the first and second light paths and includes an add/drop multiplexer for adding/dropping at least one wavelength to/from the first and second multiple wavelength signals. At the sink optical node a first demultiplexer demultiplexes the first multiple wavelength signal into separate wavelengths, and a second demultiplexer demultiplexes the second multiple wavelength signal into separate wavelengths. For each demultiplexed separate wavelength signal the sink optical node further includes first and second transponders and a coupler. The first transponder receives a given one of the separate wavelengths demultiplexed by the first demultiplexer, and outputs a first optical signal at an output. The second transponder receives a given one of the separate wavelengths demultiplexed by the second demultiplexer, and outputs a second optical signal at an output. The coupler has first and second inputs connected to the respective outputs of the first and second transponders, and an output for outputting an optical signal received at one of the first and second inputs thereof. A determining means determines if the first transponder is outputting the first optical signal. If so, the second transponder is inhibited from outputting the second optical signal so that the coupler outputs the first optical signal. If not, the second transponder is not inhibited and the coupler outputs the second optical signal.

DETAILED DESCRIPTION

Figures 2, 2A:
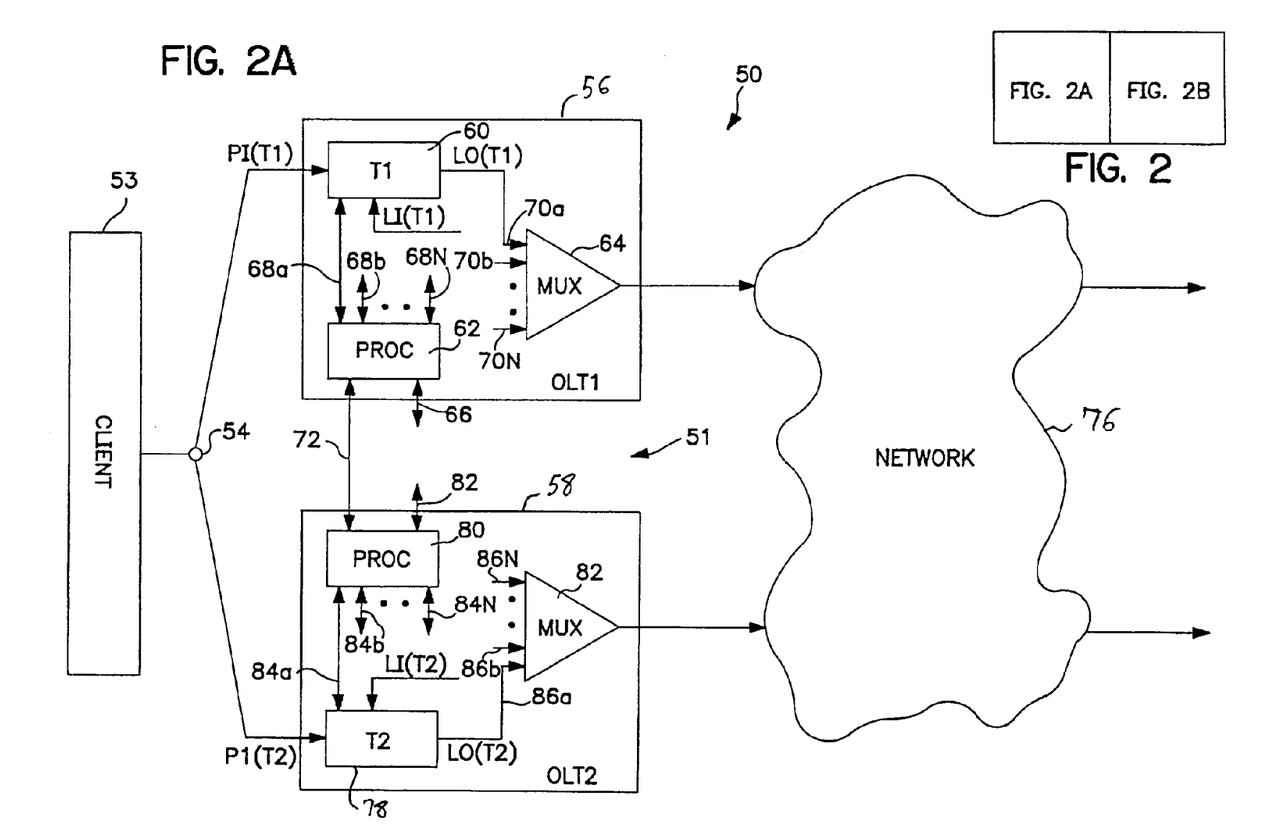
FIGS. 2A and 2B when taken together as shown in FIG. 2 form a block diagram of a WDM optical communication system in which light path failure is protected against on a per-channel basis.

Refer now to FIG. 2 which is a block diagram of a WDM optical communication system 50 for protecting against light path failure on a per-channel basis when transmitting optical signals from a source optical node 51 to a sink optical node 52 via an optical network 76.

In the description that follows system operation is described for a single given wavelength in a plurality of wavelengths that are propagated from the source optical node 51 to the sink optical node 52 as a multiple wavelength facility signal, and that at least one intermediate node may be included in the light path which includes an add/drop multiplexer for adding/dropping wavelengths to/from the multiple wavelength facility signal. It is to be appreciated that the remaining ones of the plurality of wavelengths are propagated in a like manner. Likewise, it is understood that the plurality of wavelengths are propagated in the reverse direction from the sink optical node 52 to the source optical node 51 in a similar manner.

Referring to FIG. 2A, the WDM system 50 includes the source node 51 having a client equipment 53 which outputs an optical signal at a given wavelength to an optical splitter 54 which splits the input optical signal into first and second optical signals of the given wavelength which are input to Optical Line Terminals (OLT's) 56 and 58, respectively. In practice, there are other client equipments (not shown) which input other wavelengths to other optical splitters (not shown), which split the other wavelengths into respective first and second optical signals for input to OLT's 56 and 58, respectively.

The client equipment 53 may be any one of a computer, a SONET terminal, a telephone switch, a central office switch for telephones, a digital cross-connect switch, an end device such as a terminal, or the like.

OLT 56 includes a transponder 60, a processor 62 and a multiplexer 64. It is understood that in practice, OLT 56 also includes a demultiplexer (not shown) for propagating optical signals received in the opposite direction from the sink node 52 to the source node 51.

It is also understood that OLT 56 includes other transponders (not shown) for receiving other first optical signals at different wavelengths from the other optical splitters (not shown).

The processor 62 receives system protocols and Identification Codes (ID'S) from a system manager computer (not shown) on line 66, and reports back status and the like on that line to the system manager computer. The processor 62 controls and exchanges information with transponder 60 via line 68a, and exchanges information with the other transponders (not shown), via lines 68b-68n, which provide remaining ones of the plurality of wavelengths to the multiplexer 64 on lines 70b-70n. The processor 62 communicates with a corresponding processor 80 in OLT 58 via line 72.

The first optical signal at the given wavelength is received at a Portside Input (PI) interface for transponder 60 (T1), which interface is termed PI(TI) and is output at a Lineside Output (LO) interface for transponder 60 (T1), which interface is termed LO(T1). PI(T1) and LO(T1) serve as test points to test for the presence of the first optical signal at the input and output, respectively, of transponder 60. The first optical signal output from transponder 60 on line 70a is multiplexed with the other wavelengths on lines 70b-70n by multiplexer 64 to form a first multiple wavelength optical facility signal which is output on optical fiber 74 to the network 76.

A third optical signal at the given wavelength is received at a lineside input (LI) interface for transponder 60 (T1), which interface is termed LI(T1).

The third optical signal is then provided to client equipment 53 via a coupler (not shown). The third optical signal is demultiplexed from a third multiple wavelength facility signal which is provided to a demultiplexer (not shown) in OLT 56 from interface LO(T1') of a transponder 99 in an OLT 94 at sink node 52 via the network 76. This is described in more detail with respect to FIG. 2B.

OLT 58 includes a transponder 78, a processor 80 and a multiplexer 82. It is understood that in practice, OLT 58 also includes a demultiplexer (not shown) for propagating optical signals received in the opposite direction from the sink node 52 to the source node 51. It is understood that OLT 58 includes other transponders (not shown) for receiving other second optical signals at different wavelengths from the other optical splitters (not shown).

The processor 80 receives system protocols and ID codes from the system manager (not shown) on line 82 and reports back status and the like on that line to the system manager. The processor 80 controls and exchanges information with transponder 78 via line 84a, and exchanges information with the other transponders (not shown), via lines 84b-84n, which provide remaining ones of the plurality of wavelengths to the multiplexer 82 on lines 86b-86n. The processor 80 communicates with processor 62 of OLT 56 via the line 72.

The second optical signal at the given wavelength is received at a portside input interface PI(T2) for transponder 78 and is output at a lineside output interface LO(T2). PI(T2) and LO(T2) serve as test points to test for the presence of the second optical signal at the input and output, respectively, of transponder 78. The second optical signal output from transponder 78 on line 86a is multiplexed with the other wavelengths on lines 86b-86n by multiplexer 82 to form a second multiple wavelength optical facility signal which is output on optical fiber 82 to the network 76.

A fourth optical signal at the given wavelength is received at a lineside input (LI) interface for transponder 78 (T2), which interface is termed LI(T2). The fourth optical signal is then provided to client equipment 53 via a coupler (not shown). The fourth optical signal is demultiplxed from a fourth multiple wavelength facility signal which is provided to a demultiplexer (not shown) in OLT 58 from interface LO(T2') of a transponder 112 in an OLT 96 at sink node 52 via the network 76. This is described in more detail with respect to FIG. 2B.

The network 76, for example, may be a point-to-point link, a point-to-multi-point link, a ring, a mesh or any other network configuration including intermediate optical nodes such as OLTs or Optical Add/Drop Multiplexers.

The network 76 then outputs the first and second multiple wavelength facility signals on optical fibers 90 and 92, respectively, to the sink node 52.

Figure 2B:
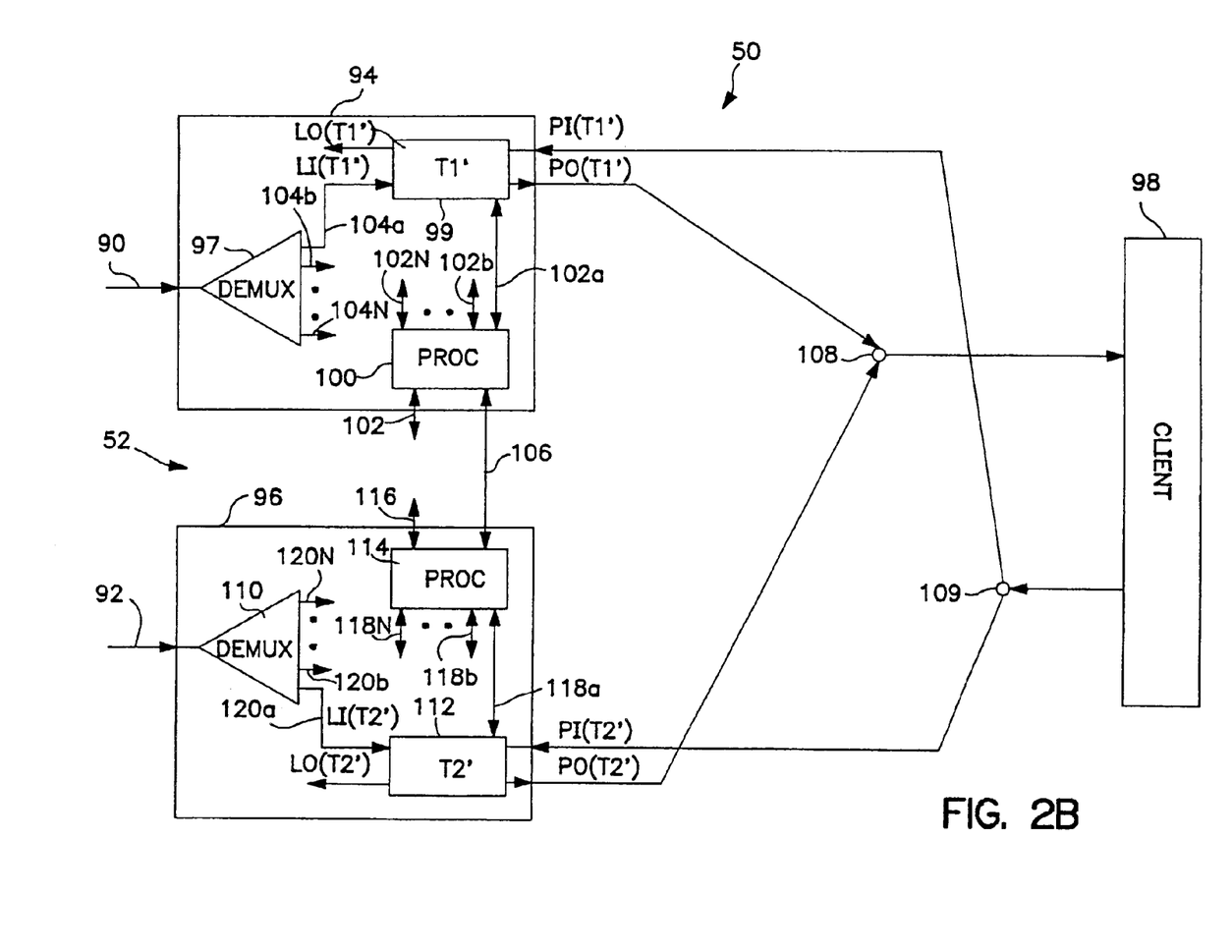

Referring to FIG. 2B, the sink node 52 includes OLT's 94 and 96 and a client equipment 98. The client equipment may be any one of a computer, a SONET terminal, a telephone switch, a central office switch for telephones, a digital cross-connect switch, an end device such as a terminal, or the like.

OLT 94 includes a demultiplexer 97, a transponder 99 and a processor 100. It is understood that in practice, OLT 94 also includes a multiplexer (not shown) for propagating optical signals in the opposite direction from the sink node 52 to the source node 51.

The processor 100 receives system protocols and IDs from the system manager computer (not shown) on line 102 and reports back status and the like on that line to the system manager computer. The processor 100 controls and exchanges information with transponder 99 via line 102a, and exchanges information with other transponders (not shown), via lines 102b-102n, which receive remaining ones of the plurality of wavelengths from the demultiplexer 97 on lines 104b-104n. The processor 100 communicates with a corresponding processor in OLT 96 via line 106.

The first optical signal demultiplexed from the first facility signal by demultiplexer 97 is provided on line 104a to lineside input interface LI(T1') of transponder 99 and is output at portside output interface PO(T1') to an optical coupler 108.

For propagation of an optical signal at the given wavelength in the opposite direction from the sink node 53 to the source node 51, the client equipment 98 provides an optical signal at the given wavelength to an optical splitter 109 which splits that signal into third and fourth optical signals at the given wavelength for provision to OLT's 94 and 96, respectively.

The third optical signal at the given wavelength is received at a portside input port interface PI(TI') of transponder 99 and is output at a lineside output port interface LO(T1') thereof for provision via the network 76 to a multiplexer (not shown) in OLT 94 which generates a third multiple wavelength facility signal for provision to interface LI(T1) of OLT 56 of source node 51 via the network 76.

Operability of transponder 99 is determined by testing for the presence of the first optical signal at interface LI(T1') and PO(T1'), and by testing for the presence of the third optical signal at interface PI(T1') and LO(T1'). This is explained in more detail with respect to FIG. 3.

OLT 96 includes a demultiplexer 110, a transponder 112 and a processor 114. It is understood that in practice, OLT 96 also includes a multiplexer (not shown) for propagating optical signals in the opposite direction from the sink node 52 to the source node 51.

The processor 114 receives system protocols and ID's from the system manager computer (not shown) on line 116 and reports back status and the like on that line to the system manager computer. The processor 114 controls and exchanges information with transponder 112 via line 118a, and exchanges information with other transponders (not shown), via lines 118b-118n, which receive remaining ones of the plurality of wavelengths from the demultiplexer 110 on lines 120b-120n. The processor 114 communicates with processor 100 in OLT 94 via the line 106.

The second optical signal demultiplexed from the second facility signal by demultiplexer 110 is provided on line 120a to lineside input interface LI(T2') of transponder 112 and is output at portside output interface PO(T2') to the output coupler 108.

The fourth optical signal at the given wavelength is received from splitter 108 at a portside input interface PI(T2') of transponder 112 and is output at a lineside output port interface LO(T2') thereof for provision via network 76 to a multiplexer (not shown) in OLT 96 which generates a fourth multiple wavelength facility signal for provision to interface LI(T2) of OLT 58 of source node 51 via the network 76.

Figures 3, 3A:
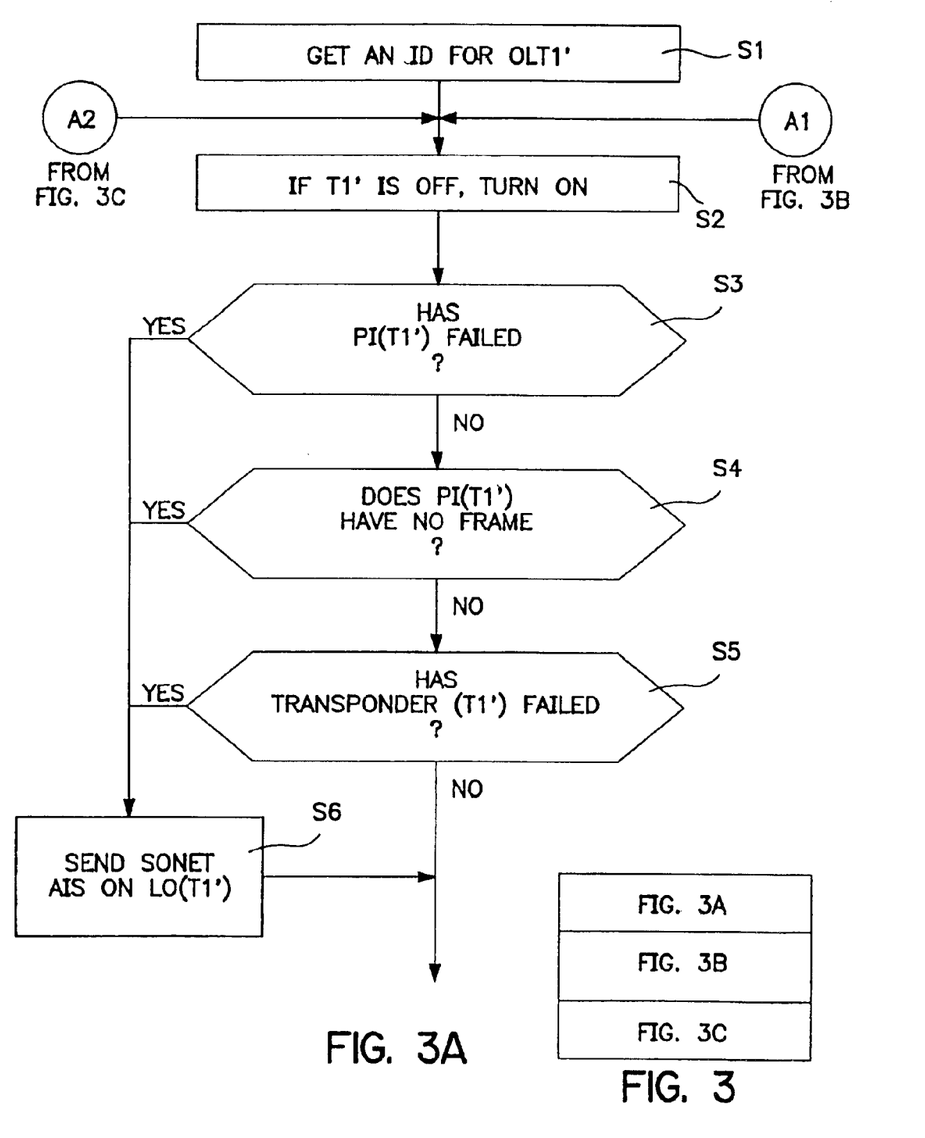
FIGS. 3A, 3B and 3C when taken together as shown in FIG. 3 form a flow chart of the control mechanism for protecting against light path failure on a per-channel basis.

As discussed above, the coupler 108 is connected to interface PO(T1') of transponder 99 of OLT 94 and interface PO(T2') of transponder 112 of OLT 96 for receiving either the first optical signal or the second optical signal as controlled by processor 100 of OLT 94 according to the control flow chart of FIG. 3 for outputting the received optical signal to client equipment 98. If it is determined that transponder 99 is transmitting the first and third optical signals, transponder 112 of OLT 96 is inhibited from outputting the second optical signal and coupler 108 only receives the first optical signal from transponder 99 of OLT 941 which in turn is provided to client equipment 98. On the other hand, if it is determined that transponder 99 is not transmitting either one of the first and third optical signals, transponder 99 in OLT 94 is inhibited from outputting the first optical signal and the coupler 108 only receives the second optical signal from transponder 112 of OLT 96, which in turn is provided to client equipment 98. This is explained in more detail below with respect to FIG. 3.

In practice, there are other couplers (not shown), each receiving other first and second optical signals from the other transponders (not shown) for outputting one of the other first and optical signals to other client equipment (not shown). Likewise, couplers (not shown) are used to source node 51 for coupling respective wavelengths received from sink node 52 via the network 76 to other client equipment.

Also in practice, there are other splitters (not shown) for coupling other individual wavelengths from other client equipment (not shown) to the other transponders (not shown) in OLT's 94 and 96.

FIG. 3 is a block diagram of the control protocol for protecting against light path failures on a per-channel basis. For purposes of explanation, the control protocol is described as being run on processor 100 of OLT 94. However, it is to be appreciated that a like protocol is run on processor 114 of OLT 96, and is also run on processor 62 of OLT 56 and processor 80 of OLT 58.

Referring to FIG. 3A, at step S1 processor 100 of OLT 94 gets an ID of 100 from the system manager computer (not shown) via the system management interface, such as CMIPT, SNMP, or TL1, and likewise the processor 114 of OLT 96 gets an ID of 20. Likewise, the system management interface provides IDs for processors 62 and 82 of OLTs 56 and 58, respectively. These ID's are unique, and for purposes of explanation the ID of OLT 94 (OLT 1') is 100 and the ID of OLT 96 (OLT 2') is 20.

Therefore, the ID of OLT 1'>ID of OLT 2'. The ID of OLT 56 (OLT 1) is 10 and the ID of OLT 58 (OLT 2) is 2. Therefore, the ID of OLT 1>ID of OLT 2.

The following steps determine the operability of transponder (T1') 99 of OLT 94 based on the failure to detect light at the respective interfaces of transponder 99. At step S2, if transponder (T1') 99 is OFF, it is turned ON. At step S3 a determination is made as to whether or not there has been a failure to detect light at interface PI(T1'). If light is detected at step S3, at step S4 a determination is made as to whether or not interface PI(T1') doesn't receive a SONET frame. If PI(T1') does receive a SONET frame, at step S5 a determination is made as to whether or not transponder (T1') 99 has failed. If transponder 99 hasn't failed, control proceeds to step S7 (FIG. 3B).

Figure 3B:
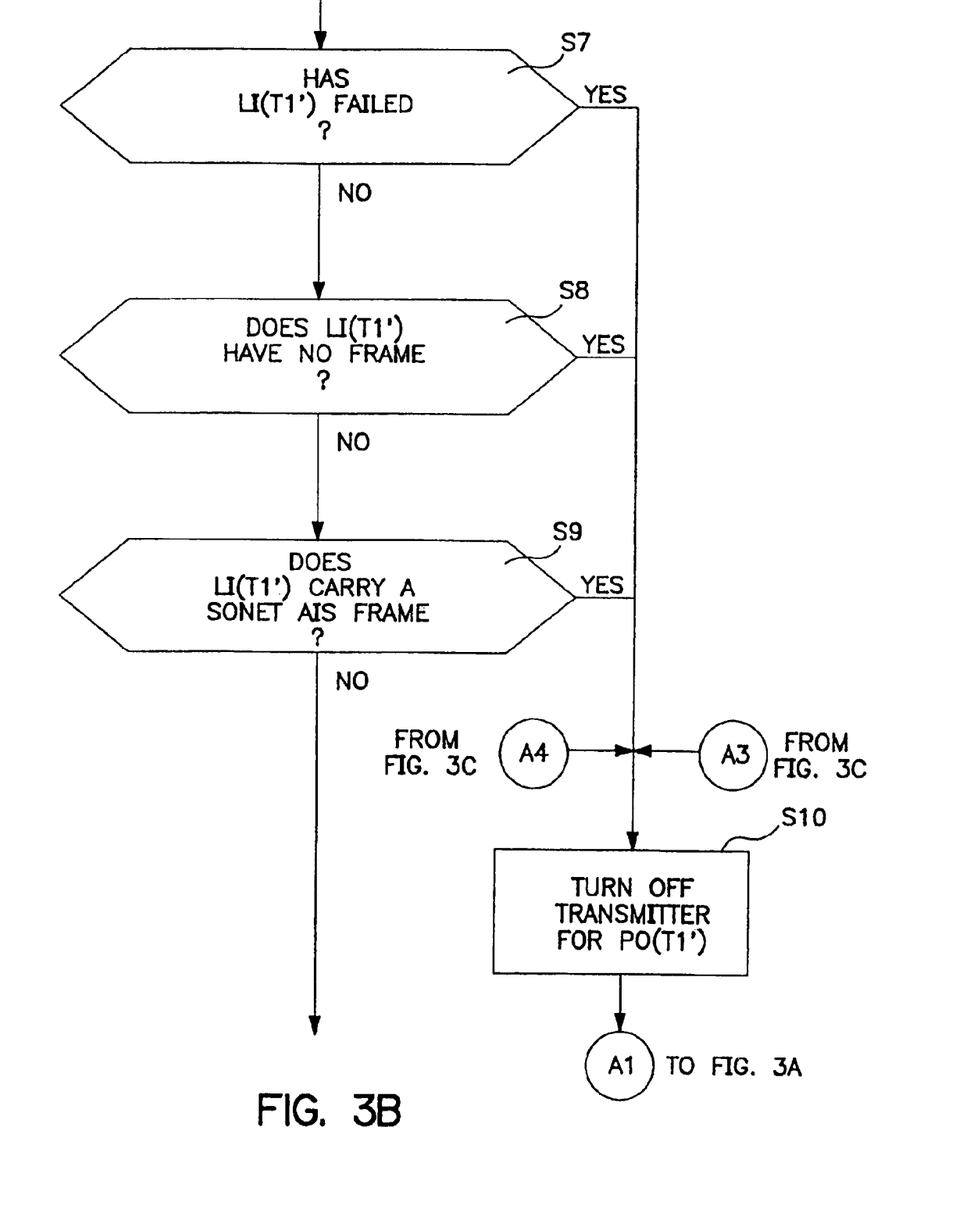

If the answer is Yes at any one of steps S3, S4 or S5, at step S6 a SONET Alarm Indication Signal (AIS) is transmitted from interface LO(T1') of transponder 99 of OLT 94 at sink node 52 to transponder 60 of OLT 56 of source node 51 via the network 76, and control proceeds to step S7 (FIG. 3B).

Referring to FIG. 3B, at step S7 a determination is made as to whether or not there has been a failure to detect light at interface LI(T1'). If light is detected, a determination is made at step S8 as to whether or not interface LI(T1') doesn't receive a SONET frame. If LI(T1') does receive a SONET frame, at step S9 a determination is made as to whether a SONET AIS frame is received at interface LI(T1') from source node 51, which is indication of a failure at the source node 51. If not, control proceeds to step S11 (FIG. 3C).

If the answer is YES at any one steps S7, S8 or S9, at step S10 the transponder (T1') 99 of OLT 94 is turned OFF and a return is made to step S2 of FIG. 3A via A1. Since only the transponder (T2') 112 of OLT 96 is ON, coupler 108 provides the second optical signal to client equipment 98.

Figure 3C:
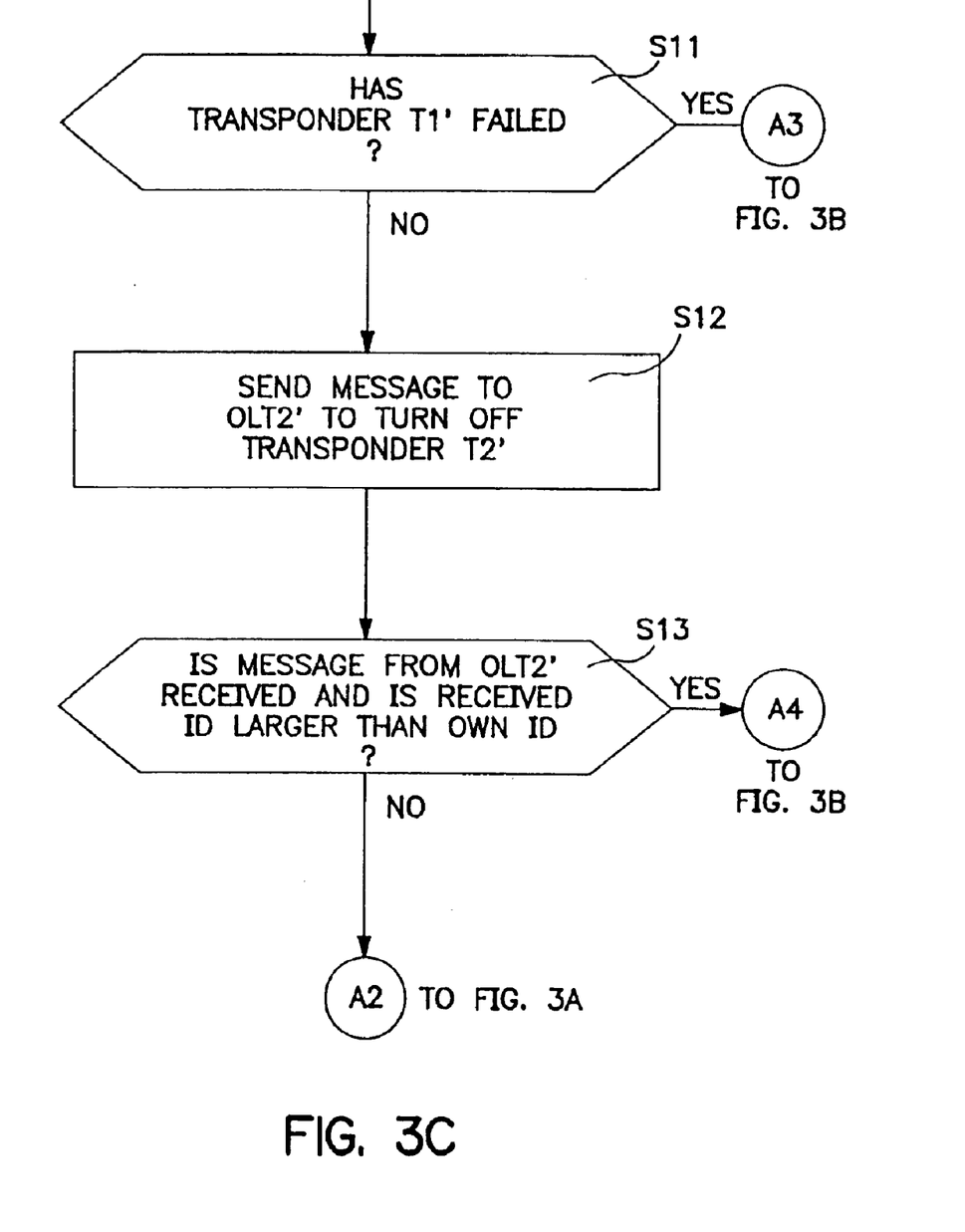

Referring to FIG. 3C, at step S11 a determination is made as to whether or not transponder 99 (T1') of OLT 94 has failed. If it has failed, a return is made to step S9 of FIG. 3B via A3, and transponder 99 (T1') of OLT 94 is turned OFF. If transponder 99 (T1') hasn't failed, at step S12 processor 100 of OLT 94 sends a message via line 106 to processor 114 of OLT 96 to turn OFF transponder 112 (T2'), so that coupler 108 only receives the first optical signal which is then received by client equipment 98. At step S13 a determination is made as to whether or not processor 100 in OLT 94 (OLT 1') is receiving a message from processor 114 in OLT 96 (OLT2') and if the ID of the received message from processor 114 of OLT 96 is greater than the ID of processor 100 of OLT 94. That is, is the ID (OLT 2')>ID (OLT 1'). If the answer is YES a return is made to step S10 of FIG. 3B via A4 and transponder 99 (T1') of OLT 94 is turned OFF. If the answer is NO a return is made to S2 via A2 and the procedure is repeated. In this instance, since the answer is No, the return is made to S2 via A2.

Thus, according to the control protocol, protection is provided against lightpath failure, and coupler 108 only receives either the first or second optical signal at any given time for provision to client equipment 98.

In summary, in the apparatus of the present invention in a WDM optical communication system, light path failure is protected against on a per-channel wavelength basis using passive optics such as splitters and couplers which are less susceptible to failure than active devices such as switches.

Although certain embodiments of the invention have been described and illustrated herein, it will be readily apparent to those of ordinary skill in the art that a number of modifications and substitutions can be made to the preferred example methods and apparatus disclosed and described herein without departing from the true spirit and scope of the invention.

What is claims is:

1. In a wavelength division multiplexed communication system, an apparatus for protection against a lightpath failure from a source optical node to a sink optical node, comprising:

said source optical node having first and second outputs for respectively outputting single wavelength first and second optical signals;

a first lightpath, with said first lightpath being coupled to the first output of said source optical node for receiving the first optical signal;

a second light path, with said second lightpath being coupled to the second output of said source optical node for receiving the second optical signal;

said sink optical node having first and second inputs and first and second outputs, with the first input being coupled to said first lightpath for receiving the first optical signal and for outputting the first optical signal at the first output, with the second input being coupled to said second lightpath for receiving the second optical signal and for outputting the second optical signal at the second output;

a coupler having first and second inputs and an output, with the first and second inputs being coupled to the first and second outputs, respectively, of said sink optical node, and for outputting at the output an optical signal received at one of the first and second inputs;

an input for inputting a third optical signal to a third input of said sink optical node, for outputting the third optical signal at a third output of said sink optical node for transmission to said source optical node; and a detector for detecting if said sink optical node is outputting the third optical signal in addition to the first optical signal, and if so, inhibiting said sink optical node from outputting the second optical signal so that said coupler outputs the first optical signal, and if not, not inhibiting said sink optical node from outputting the second optical signal so that said coupler outputs the second optical signal.

2. In a wavelength division multiplexed communication system, a method of protecting against a lightpath failure from a source optical node to a sink optical node, comprising:

outputting at said source optical node onto a first lightpath a single wavelength first optical signal, and outputting onto a second lightpath a single wavelength second optical signal;

receiving at said sink optical node from the first light path at a first input the first optical signal, and receiving from the second light path at a second input the second optical signal;

outputting at said sink optical node at a first output the first optical signal, and outputting at a second output the second optical signal;

coupling the first and second outputs of said sink optical node to first and second inputs, respectively, of a coupler, with the coupler having an output for outputting an optical signal coupled to one of the first and second inputs thereof;

inputting a third optical signal to a third input of said sink optical node, for outputting the third optical signal at a third output of said sink optical node for transmission to said source optical node; and detecting if said sink optical node is outputting the third optical signal in addition to the first optical signal, and if so, inhibiting said sink optical node from outputting the second optical signal so that said coupler outputs the first optical signal, and if not, not inhibiting said sink optical node from outputting the second optical signal so that said coupler outputs the second optical signal.

3. In a wavelength division multiplexed communication system, apparatus for protecting against a failure in a light path from a source optical node to a sink optical node on a per-channel basis, the combination comprising:

an input for inputting a single wavelength optical signal;

an optical splitter for splitting the input single wavelength optical signal into first and second optical signals;

said source optical node comprising:

a multiplexer for separately multiplexing the first and second optical signals with other optical signals of different wavelengths for respectively outputting on first and second light paths first and second multiple wavelength signals;

said sink optical node comprising:

a demultiplexer for separately demultiplexing the first and second multiple wavelength signals into separate wavelengths including the first and second optical signals;

first and second transponders for receiving the first and second optical signals at respective inputs thereof, with said first and second transponders each having an output at which the first and second optical signals are provided, respectively;

a coupler having first and second inputs connected to the outputs of said first and second transponders, respectively, and an output for outputting an optical signal received at one of the first and second inputs thereof; and a detector for detecting if said first transponder is outputting the first optical signal, and if so, inhibiting said second transponder from outputting the second optical signal so that said coupler outputs the first optical signal, and if not, not inhibiting said second transponder so that said coupler outputs the second optical signal.

4. The wavelength division multiplexed communication system according to claim 3, wherein the first and second optical signals have a same wavelength.

5. The wavelength division multiplexed communication system according to claim 3, wherein at least one of said first and second lightpaths includes at least one intermediate optical node.

6. The wavelength division multiplexed communication system according to claim 5, wherein said at least one intermediate optical node comprises one of an optical line terminal and an add/drop multiplexer.

7. The wavelength division multiplexed communication system according to claim 3, wherein said first and second light paths are part of an optical network.

8. The wavelength division multiplexed communication system according to claim 3, wherein said coupler is a passive coupler.

9. The wavelength division multiplexed communication system according to claim 3, wherein said sink optical node further comprises:
an input for inputting a third optical signal at a given wavelength to another input of said first transponder for outputting at another output of said first transponder for transmission to said source optical node,
with said detector further detecting if said first transponder is outputting the third optical signal in addition to the first optical signal, and if so, inhibiting said second transponder from outputting the second optical signal so that said coupler outputs the first optical signal, and if not, not inhibiting said second transponder so that said coupler outputs the second optical signal.

10. In a wavelength division multiplexed communication system, apparatus for protecting against a failure in a light path from a source optical node to a sink optical node, including at least one intermediate optical node, comprising:
an output at said source optical node for outputting first and second multiple wavelength signals on respective first and second light paths;
said at least one intermediate node including an add/drop multiplexer for adding/dropping at least one wavelength to/from the first and second multiple wavelength signals;
said sink optical node comprising:
a first demultiplexer for demultiplexing the first multiple wavelength signal into separate wavelengths;
a second demultiplexer for demultiplexing the second multiple wavelength signal into separate wavelengths;
said sink optical node further comprising, for each separate wavelength:
a first transponder for receiving at an input a given one of the separate wavelengths demultiplexed by said first demultiplexer, and for outputting a first optical signal at an output;
a second transponder for receiving at an input a given one of the separate wavelengths demultiplexed by said second demultiplexer, and for outputting a second optical signal at an output;
a coupler having first and second inputs connected to the outputs of said first and second transponders, respectively, and an output for outputting an optical signal received at one of the first and second inputs thereof; and
a detector for detecting if said first transponder is outputting the first optical signal, and if so, inhibiting said second transponder from outputting the second optical signal so that said coupler outputs the first optical signal, and if not, not inhibiting said second transponder so that said coupler outputs the second optical signal.

11. The wavelength division multiplexed communication system according to claim 10, wherein the first and second optical signals have a same wavelength.

12. The wavelength division multiplexed communication system according to claim 10, wherein said coupler is a passive coupler.

13. The combination claimed in claim 10, wherein said sink optical node further comprises:
an input for inputting a third optical signal at the given wavelength to another input of said first transponder for outputting at another output of said first transponder for transmission to said source optical node,
with said detector further detecting if said first transponder is outputting the third optical signal in addition to the first optical signal, and if so, inhibiting said second transponder from outputting the second optical signal so that said coupler outputs the first optical signal, and if not, not inhibiting said second transponder so that said coupler outputs the second optical signal.

14. A wavelength division multiplexed communication system, comprising:
a source optical node having first and second outputs through which respective first and second optical signals are outputted;
a sink optical node having first and second inputs and first and second outputs;
a first lightpath coupled between the first output of said source optical node and the first input of said sink optical node;
a second light path coupled between the second output of said source optical node and the second input of said sink optical node; and
a passive optical coupler, having a first input coupled to the first output of said sink optical node, a second input coupled to the second output of said sink optical node, and an output coupled through the passive optical coupler to the first and second inputs of said passive optical coupler,
wherein at least one of said source optical node and said sink optical node further comprises a controller, wherein at least one of said source optical node and said sink optical node further comprises a third signal input, arranged to input a third optical signal into the at least one of said source optical node and said sink optical node, and a third signal output, arranged to output the third optical signal from the at least one of said source optical node and said sink optical node, and wherein said controller determines if the first optical signal and the third optical signal are present in said at least one of said source optical node and said sink optical node, and if so, said controller inhibits the second optical signal from being provided to the second input of said passive optical coupler, and permits the first optical signal to be provided to the first input of said passive optical coupler, and if not, said controller inhibits the first optical signal from being provided to the first input of said passive optical coupler and permits the second optical signal to be provided to the second input of said passive optical coupler.

15. An optical communication system, comprising:
plural optical communication paths arranged to propagate corresponding optical signals;
a passive optical coupler having a plurality of inputs coupled through said passive optical coupler to an output of said passive optical coupler, each of the inputs being coupled in a corresponding one of said optical communication paths; and at least one optical node interposed in the plural optical communication paths, each at least one optical node comprising at least one sub-node arranged to perform detecting of at least one predetermined condition indicating that there has been a failure in at least one of the plural optical communication paths, and being responsive to detecting the at least one predetermined condition by preventing an optical signal from continuing to propagate in the at least one optical communication path towards a corresponding one of the inputs of said passive optical coupler coupled in that at least one optical communication path, while permitting at least one other optical signal to propagate towards at least one other corresponding input of said passive optical coupler through at least one other corresponding optical communication path, wherein each of the optical signals has a same wavelength, and wherein each at least one sub-node comprises:
  at least one first transponder coupled in the at least one optical communication path; and
  a first controller coupled to said at least one first transponder, said first controller arranged to perform the detecting of the at least one predetermined condition, and being responsive to detecting the at least one predetermined condition for controlling said at least one first transponder so as to substantially prevent said at least one first transponder from propagating the optical signal in the at least one optical communication path.

16. The optical communication system according to claim 15, further comprising at least one of an intermediate optical node and an optical network coupled in said plural optical communication paths.

17. The optical communication system according to claim 15, wherein the at least one sub-node includes a first sub-node and a second sub-node, the first sub-node comprising said at least one first transponder and said first controller, the second sub-node comprising:

at least one second transponder coupled in the at least one other corresponding optical communication path, and at least one second controller coupled to said at least one second transponder, said at least one second controller arranged to detect the at least one predetermined condition indicating that there has been a failure in the at least one other corresponding optical communication path, and being responsive thereto by controlling said at least one second transponder so as to substantially prevent said at least one second transponder from propagating the at least one other optical signal in the at least one other corresponding optical communication path, and, if the at least one predetermined condition is not detected by said at least one second controller, said at least one second controller does not prevent the at least one second transponder from propagating the at least one other optical signal in the at least one other corresponding optical communication path.

18. The optical communication system according to claim 17, wherein each of the optical signals has substantially a same wavelength.

19. The optical communication system according to claim 18, further comprising at least one further optical node interposed in the plural optical communication paths, each at least one further optical node comprising:

a third sub-node comprising:
  at least one third transponder coupled in the at least one optical communication path, and
  at least one third controller coupled to said at least one third transponder, said at least one third controller arranged to detect the at least one predetermined condition indicating that there has been a failure in the at least one optical communication path, and being responsive thereto by controlling said at least one third transponder so as to substantially prevent said at least one third transponder from propagating the optical signal in the at least one optical communication path, and, if the at least one predetermined condition is not detected by said at least one third controller, said at least one third controller does not prevent the at least one third transponder from propagating the optical signal in the at least one optical communication path; and a fourth sub-node comprising:
  at least one fourth transponder coupled in the at least one other corresponding optical communication path, and
  at least one fourth controller coupled to said at least one fourth transponder, said at least one fourth controller arranged to detect the at least one predetermined condition indicating that there has been a failure in the at least one other corresponding optical communication path, and being responsive thereto by controlling said at least one fourth transponder so as to substantially prevent said at least one fourth transponder from propagating the at least one other optical signal in the at least one other corresponding optical communication path, and, if the at least one predetermined condition is not detected by said at least one fourth controller, said at least one fourth controller does not prevent the at least one fourth transponder from propagating the at least one other optical signal in the at least one other corresponding optical communication path.

20. The optical communication system according to claim 19, wherein said first sub-node further comprises at least one first multiplexer having at least one input and an output coupled in the at least one optical communication path, after the at least one first transponder, said second sub-node further comprises at least one second multiplexer having at least one input and an output coupled in the at least one other corresponding optical communication path, after the at least one second transponder, the third sub-node further comprises at least one first demultiplexer having an input and at least one output coupled in the at least one optical communication path, before the at least one third transponder, and the fourth sub-node further comprises at least one second demultiplexer having an input and at least one output coupled in the at least one other corresponding optical communication path, before the at least one fourth transponder.

21. An optical communication system, comprising:
  plural optical communication paths;
  a passive optical coupler having a plurality of inputs coupled through said passive optical coupler to an output of said passive optical coupler, each of the inputs also being coupled in a corresponding one of said optical communication paths; and
  at least one optical node, each comprising:
    plural optical line terminals, each of said plural optical line terminals being interposed in a corresponding at least one of said plural optical communication paths, each of said plural optical line terminals being operable to either (a) substantially prevent an optical signal propagating in that corresponding at least one optical communication path from reaching a corresponding one of the inputs of said passive optical coupler through the at least one optical communication path, or (b) permit the optical signal to propagate in that corresponding at least one optical communication path towards the corresponding one of the inputs of said passive optical coupler, wherein each of said optical line terminals comprises:
at least one transponder coupled in the corresponding at least one of the optical communication paths in which the optical line terminal is interposed; and
a controller coupled to said at least one transponder, said controller being operable to control said at least one transponder to cause said at least one transponder to either substantially prevent the optical signal propagating in the corresponding at least one optical communication path from reaching the corresponding one of the inputs of said passive optical coupler, or propagate the optical signal in the corresponding at least one optical communication path towards the corresponding one of the inputs of said passive optical coupler.

22. The optical communication system according to claim 21, wherein each of the optical signals has a same wavelength.

23. The optical communication system according to claim 21, wherein in a case where a first one of said optical line terminals operates to substantially prevent an optical signal of a predetermined wavelength from reaching said passive optical coupler, a second one of said optical line terminals operates to permit an optical signal of the predetermined wavelength to propagate towards said passive optical coupler.

24. The optical communication system according to claim 21, wherein said controller has an input and is operable in response to information being applied to the input.

25. The optical communication system according to claim 24, wherein if the information is indicative of a failure in the corresponding at least one optical communication path, said controller of a corresponding one of said optical line terminals controls said at least one transponder of a same one of said optical line terminals to substantially prevent the optical signal propagating in the corresponding at least one corresponding optical communication path from reaching the corresponding input of said passive optical coupler.

26. The optical communication system according to claim 21, wherein each of said optical line terminals is operable to substantially prevent the optical signal from reaching the corresponding one of the inputs of said passive optical coupler through the at least one optical communication path, in response to receiving a predetermined message forwarded from another one of said optical line terminals.

27. The optical communication system according to claim 26, wherein the predetermined message indicates that a communication path failure has been recognized by the one of said optical line terminals which forwarded the predetermined message.

28. A wavelength division multiplexed communication system for protecting against a failure in a light path, the communication system comprising:
an optical splitter, arranged to split an applied single wavelength optical signal into first and second optical signals;
a source optical node comprising:
at least one multiplexer, coupled to the first and second optical signals, and arranged to separately multiplex the first and second optical signals with other optical signals of different wavelengths to respectively output on first and second light paths first and second multiple wavelength signals including the first and second optical signals, respectively;
a sink optical node comprising:
at least one demultiplexer, coupled to the first and second multiple wavelength signals through the first and second light paths, respectively, and arranged to separately demultiplex the first and second multiple wavelength signals, which include at least the first and second optical signals, respectively, into separate wavelengths, and
first and second transponders having inputs arranged to receive the first and second optical signals, respectively, from said at least one demultiplexer, said first and second transponders each having an output at which the first and second optical signals, respectively, are outputted; and
a coupler having a first input coupled to the output of the first transponder, and a second input coupled to the output of the second transponder, said coupler also having a corresponding output for outputting an optical signal applied to at least one of the first and second inputs thereof,
wherein said sink optical node further comprises a controller which is operable to either (a) control the second transponder to substantially prevent the second transponder from outputting the second optical signal, while permitting the first transponder to output the first optical signal towards the first input of said coupler, or (b) control the first transponder to substantially prevent the first transponder from outputting the first optical signal, while permitting the second transponder to output the second optical signal towards the second input of said coupler.

29. A wavelength division multiplexed communication system for protecting against a failure in a light path, the communication system comprising:
a source optical node, arranged to output first and second multiple wavelength signals on respective first and second light paths;
at least one intermediate node including an add/drop multiplexer, arranged to add/drop at least one wavelength to/from the first and second multiple wavelength signals;
a sink optical node comprising:
a first demultiplexer coupled to the first multiple wavelength signal through the first light path, and arranged to multiplex the first multiple wavelength signal into separate wavelengths,
a second demultiplexer coupled to the second multiple wavelength signal through the second light path, and arranged to demultiplex the second multiple wavelength signal into separate wavelengths,
for each separate wavelength separated by said first demultiplexer, a first transponder having an input which receives the separate wavelength, and an output which outputs a corresponding first signal,
for each separate wavelength separated by said second demultiplexer, a second transponder which has an input which receives the separate wavelength from said second demultiplexer, and an output which outputs a corresponding second signal; and at least one coupler having first and second inputs connected to the outputs of the first and second transponders, respectively, and an output for outputting an optical signal applied to at least one of the first and second inputs thereof, wherein said sink optical node further comprises a controller which is operable to perform either (a) controlling the second transponder to substantially prevent the second transponder from outputting the second signal, while permitting the first transponder to output the first signal towards the first input of said coupler, or (b) controlling the first transponder to substantially prevent the first transponder from outputting the first signal, while permitting the second transponder to output the second signal towards the second input of said coupler.

30. A wavelength division multiplexed communication system as set forth in claim 29, wherein said controller performs at least one of (a) and (b) based on whether said controller receives information indicative of a failure condition.

31. An optical communication system, comprising:

plural optical communication paths;

a passive optical coupler having a plurality of inputs coupled through said passive optical coupler to an output of said passive optical coupler, each of the inputs also being coupled in a corresponding one of said optical communication paths; and at least one optical node, each comprising:

plural optical line terminals, each of said plural optical line terminals being interposed in a corresponding at least one of said plural optical communication paths, each of said plural optical line terminals being operable to either (a) substantially prevent an optical signal propagating in that corresponding at least one optical communication path from reaching a corresponding one of the inputs of said passive optical coupler through the at least one optical communication path, or (b) permit the optical signal to propagate in that corresponding at least one optical communication path towards the corresponding one of the inputs of said passive optical coupler, wherein each of said optical line terminals is operable to substantially prevent the optical signal from reaching the corresponding one of the inputs of said passive optical coupler through the at least one optical communication path, in response to receiving a predetermined message forwarded from another one of said optical line terminals.

32. The optical communication system according to claim 31, wherein each of the optical signals has a same wavelength.

33. The optical communication system according to claim 31, wherein in a case where a first one of said optical line terminals operates to substantially prevent an optical signal of a predetermined wavelength from reaching said passive optical coupler, a second one of said optical line terminals operates to permit an optical signal of the predetermined wavelength to propagate towards said passive optical coupler.

34. The optical communication system according to claim 31, wherein each of said optical line terminals comprises:

at least one transponder coupled in the corresponding at least one of the optical communication paths in which the optical line terminal is interposed; and a controller coupled to said at least one transponder, said controller being operable to control said at least one transponder to cause said at least one transponder to either substantially prevent the optical signal propagating in the corresponding at least one optical communication path from reaching the corresponding one of the inputs of said passive optical coupler, or propagate the optical signal in the corresponding at least one optical communication path towards the corresponding one of the inputs of said passive optical coupler.

35. The optical communication system according to claim 34, wherein said controller has an input and is operable in response to information being applied to the input.

36. The optical communication system according to claim 35, wherein if the information is indicative of a failure in the corresponding at least one optical communication path, said controller of a corresponding one of said optical line terminals controls said at least one transponder of a same one of said optical line terminals to substantially prevent the optical signal propagating in the corresponding at least one corresponding optical communication path from reaching the corresponding input of said passive optical coupler.

37. The optical communication system according to claim 31, wherein the predetermined message indicates that a communication path failure has been recognized by the one of said optical line terminals which forwarded the predetermined message.

* * * * *

UNITED STATES PATENT AND TRADEMARK OFFICE
CERTIFICATE OF CORRECTION

PATENT NO. : 6,898,376 B1
DATED : May 24, 2005
INVENTOR(S) : Ornan A. Gerstel et al.

It is certified that error appears in the above-identified patent and that said Letters Patent is hereby corrected as shown below:

Title page,
Item [60], Related U.S. Application Data,
"Provisional application No. 60/112,412, filed on December 14, 1995." should read
-- Provisional application No. 60/112,412, filed on December 14, 1998. --.

Column 3,
Line 23, "(ID'S)" should read -- (ID's) --.

Column 5,
Line 50, "941 which" should read -- 94, which --.

Signed and Sealed this

Twenty-fifth Day of April, 2006

JON W. DUDAS
*Director of the United States Patent and Trademark Office*